Nov. 29, 1966 K. KROHNCKE 3,288,395
HELICOPTER
Filed Dec. 7, 1964 3 Sheets-Sheet 1
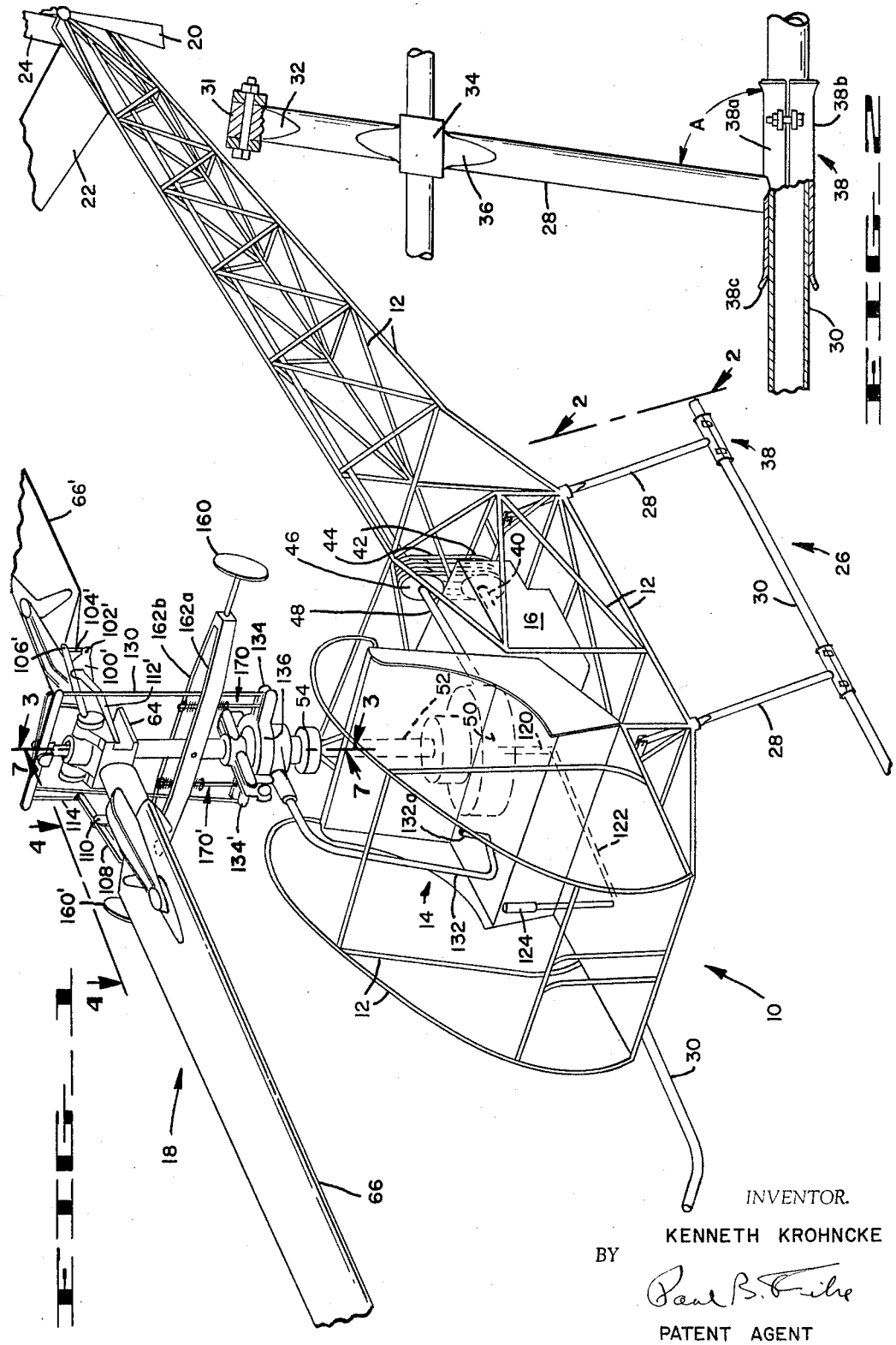
INVENTOR.
KENNETH KROHNCKE
BY
PATENT AGENT Nov. 29, 1966     K. KROHNCKE     3,288,395
HELICOPTER
Filed Dec. 7, 1964     3 Sheets-Sheet 2
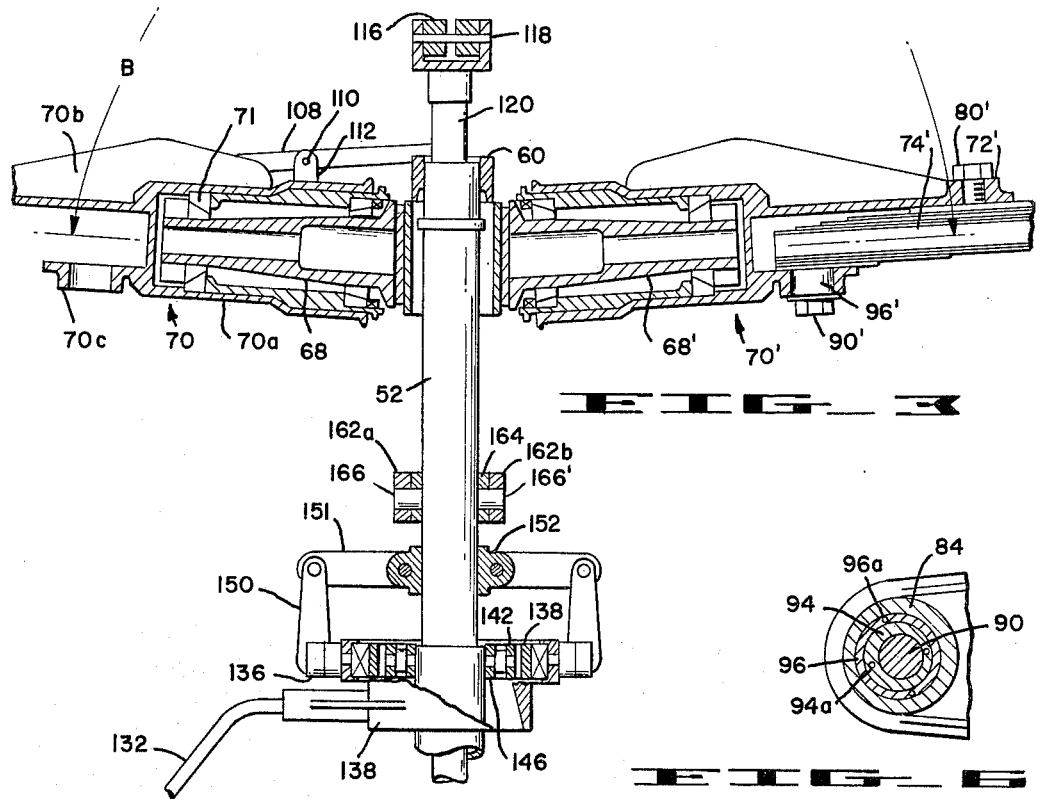
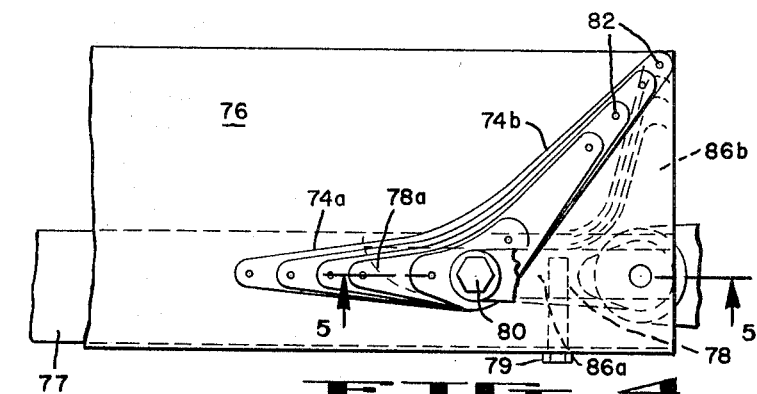
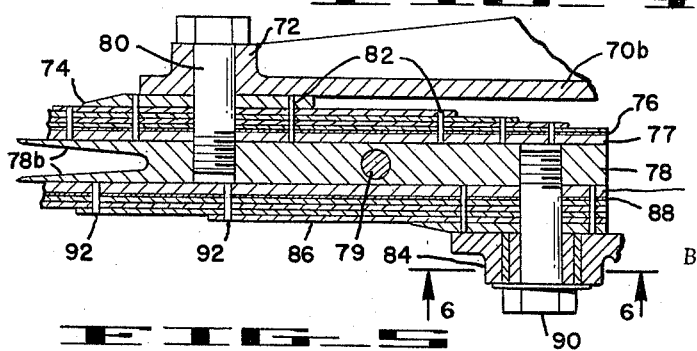
INVENTOR.
KENNETH KROHNCKE
BY
Paul B. Fike
PATENT AGENT

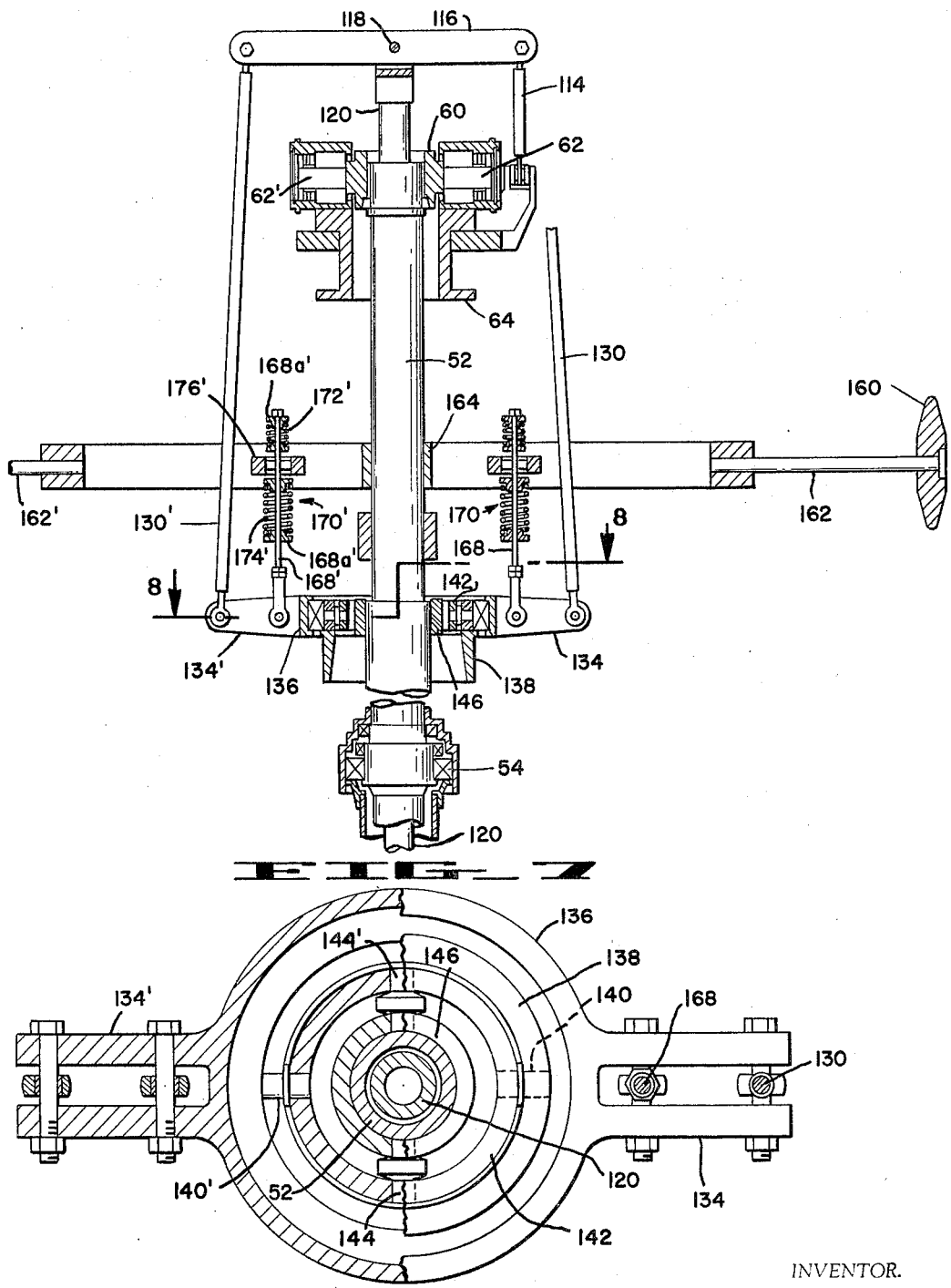

United States Patent Office 3,288,395
Patented Nov. 29, 1966

3,288,395
HELICOPTER
Kenneth Krohncke, 919 S. 7th St., San Jose, Calif.
Filed Dec. 7, 1964, Ser. No. 416,419
13 Claims. (Cl. 244—17.17)

The present invention relates generally to aircraft and more particularly to helicopters.

Although the general design characteristics of helicopters are currently quite well established, the structural implementation of such characteristics has presented a number of difficult problems. For example, stability of helicopters under variant flight conditions has posed a severe problem which, for the most part, has been solved only by the artistry of the pilot. While it is true that various stabilizers have been proposed and utilized, based primarily upon empirical considerations, such mechanisms not only add to the complexity and cost of the helicopter, but also have, in many instances, presented yet additional control problems to the pilot.

As a result of this and many other problems which remain unsolved, it is a general object of the present invention to provide a helicopter incorporating many features which in toto produce a simple, inexpensive structure having excellent flight and control characteristics.

More particularly, it is a particularly significant feature of the invention to provide a helicopter having a dynamically balanced, sustaining rotor system whose overall aerodynamic characteristics are excellent.

Specifically, it is a feature of the invention to provide a balanced rotor system including two blades and operatively associated balancing weights arranged to enhance the stability of the helicopter.

A further feature is the provision of a pivoted mounting for the rotor blades whereby equalization of lift forces is automatically achieved.

An additional feature relating to the sustaining rotor system is the provision of a "lost motion" control mechanism which further enhances the flight stability of the helicopter.

A related feature of the invention is provision of the simple yet effective mechanism for controlling the requisite cyclical pitch of the rotor blades.

Specifically, it is a feature to provide an improved mounting structure for each of the blades which provides effective structural support without detracting from the requisite cyclical variation in blade pitch.

An additional feature relating to the mounting of the blades provides a simplified adjustment for setting the blades to a desired sweep angle without diminuation of the overall strength characteristics of the sustaining rotor.

Another feature of the invention relates to the blade structure itself which is reinforced in a fashion to provide effective stress distribution and thus avoid structural failure of the blades.

Yet another feature of the invention relates to the landing gear of the aircraft which is exceedingly simple yet provides for desirable shock absorption without production of excessive stress thereon.

These as well as other objects and features of the invention will become more apparent from a perusal of the following description of an exemplary embodiment of the invention as shown in the accompanying drawings wherein:

FIG. 1 is a perspective view of a helicopter embodying the present invention,

FIG. 2 is an enlarged fragmentary elevational view of a portion of the landing gear of the helicopter as viewed from line 2—2 on FIG. 1, portions of the structure being broken away and illustrated in section, FIG. 3 is an enlarged vertical sectional view taken along line 3—3 of FIG. 1 and illustrating the drive and control arrangement for the sustaining rotor of the helicopter, FIG. 4 is an enlarged fragmentary top plan view of a portion of a rotor blade as viewed from line 4—4 of FIG. 1, FIG. 5 is a transverse sectional view taken along line 5—5 of FIG. 4, FIG. 6 is a fragmentary sectional view taken along line 6—6 of FIG. 5, FIG. 7 is a vertical sectional view through the drive and control arrangement for the sustaining rotor taken along line 7—7 of FIG. 1, and FIG. 8 is a transverse sectional view taken along line 8—8 of FIG. 7.

With initial reference to FIG. 1, the helicopter constituting one embodiment of the present invention includes a body or fuselage 10 which can be formed in a generally conventional fashion from a plurality of tubular frame elements 12. A cockpit 14 is formed at one end of the body 10 immediately in front of a suitable engine 16 which, as will be described in detail hereinafter, is arranged to drive a lift or sustaining rotor 18 supported from the fuselage immediately above the engine and a torque-compensating rotor 20 of conventional design supported at the remote or tail end of the fuselage adjacent a conventional elevator 22 and a steering rudder 24, the rotor is controlled by simple pedals (not shown) located in the cockpit in a known fashion forming no part of the present invention so that further details thereof will not be described.

A landing gear, generally indicated at 26, is disposed under the fuselage 10 and more particular under the engine 16 and cockpit portion 14 thereof so as generally to be positioned under the center of gravity of the entire structure. In accordance with the present invention the landing gear 26 is formed from simple tubular members of steel or aluminum having the requisite strength characteristics for adequate support and arranged to provide a shock absorption mechanism of particularly simple and inexpensive design.

More particularly, such landing gear 26 includes four legs 28 secured at their upper ends to the fuselage 10 and at their lower ends to a pair of ground engaging runners 30, each runner and two associated legs being arranged in mirror symmetry relative to the other runner and its legs. As best shown in FIG. 2, each leg 28 is bolted at its upper end within a tubular socket 31 that is secured to a transverse frame member so as to extend generally downwardly, but also outwardly and forwardly relative to a vertical line so that the tubular leg received therewithin attains the same general disposition. Adjacent the socket 31, the leg 28 has welded thereto a tapered reinforcing member indicated at 32 in FIG. 2 so that stress resultant from bending of the leg will be distributed rather than being concentrated at a single point of juncture. At an intermediate level, the leg 28 passes slidably through a sleeve 34 mounted on a longitudinal frame member, the leg being provided with an additional stress-distributing member 36 at this intermediate position. At its lower end, the tubular leg 28 is welded to the upper portion 38a of a cylindrical clamp 38 whose lower portion 38b is bolted to the upper portion in angular clamping engagement with the runner 30 so that the runner attains a substantially horizontal disposition as shown in FIG. 1. Preferably the angle indicated at A in FIG. 2 is approximately 80°. The extremities of the clamp 38 are preferably distended as indicated at 38c so that bending stresses on the runner 30 or the leg 28 will also be distributed thus to preclude structural failure.

As a result of the angular disposition of the legs 28 and their inherent flexibility, they may bend as the runner 30 initially engages the ground during a landing operation to perform the mentioned shock-absorption function, without the necessity of incorporation of conventional relatively expensive shock-absorbing members. The bending stresses are within the structural tolerances of the tubes and are not concentrated at their points of juncture because of the described tapered and distended configurations. Thus, an extremely simple yet effective landing gear is provided.

The mentioned engine 16 is mounted on the fuselage 10 so that its drive shaft 40 projects rearwardly toward the tail portion of the helicopter and mounts at its extremity a plurality of pulleys 42 about which an equal number of pulley belts 44 are trained to enable the establishment of drive connection with a similar number of pulleys 46 mounted on another elongated shaft supported by suitable bearings to extend substantially longitudinally of the fuselage. The rearwardly extending portion of this elongated shaft 48 is connected in a suitable fashion to the transversely disposed mounting shaft for the aforementioned torque-compensating rotor 20 at the tail end of the fuselage. The remote forwardly projecting end of the elongated shaft 48 enters a gear box 50 mounted above the engine 16 on the fuselage frame to establish driving connection with a substantially vertically disposed shaft 52 which carries the sustaining rotor 18 at its upper extremity. The rotor shaft 52 is hollow and is rotatably supported at its lower end in the gear box 50 and at an intermediate level by a bearing 54 shown in FIGS. 1 and 7, the bearing housing being supported by suitable frame elements. Preferably the gear box 50 and the bearing 54 are positioned so that the rotor shaft 52 is tipped forwardly from a precise vertical disposition by an angle of 4°, such inclination enhancing the normal forward flight characteristics of the helicopter.

As shown best in FIGS. 1, 3 and 7, a heavy ring 60 is secured to the upper extremity of the rotor shaft and two pivot pins 62, 62' also of heavy construction project laterally from the ring at diametrically opposite positions to support for limited rotation a tiltable mounting hub 64 for the two blades 66, 66' which conjointly form the sustaining rotor 18. In rectangular relationship to the pivot pins 62, 62', two short spokes 68, 68' project outwardly and slightly upwardly from the hub 64 so that the blades can be mounted with an included angle therebetween of 178.5° as indicated at B in FIG. 3 thus to define a so-called coning angle of 1½° for the sustaining rotor. Each blade 66 or 66' is mounted from its respective spoke 68 or 68' in like fashion to the other so that the mounting for only one blade will be described and the corresponding elements for mounting the other rotor blade will be differentiated by a prime notation.

Each spoke 68 projects into the sleeve portion 70a at the inner end of a blade-mounting bracket 70 and rotatably supports such bracket by a suitable anti-thrust bearing 72' enabling cyclical variation in blade pitch as will be described hereinafter. The blade-mounting bracket 70 also integrally incorporates a pair of flanges 70b, 70c which extend outwardly from the sleeve portion 70a of the blade-mounting bracket and are arranged to encompass the upper and lower surfaces of the rotor blade 66 at positions of maximum blade thickness located slightly rearwardly from the leading edge of the blade. As best shown in FIG. 5, the upper flange 70b is considerably longer than the lower flange 70c and is provided adjacent its outer extremity with a boss 72 having a substantially vertical opening therethrough which opening registers in turn with aligned openings in a plurality of laminar reinforcing ribs 74, the top metal skin 76 of the blade, a longitudinal supporting strut 77 therefor and a central core member 78 within the blade. The opening in the core member 78 is threaded for reception of a bolt 80 whose head engages the top of the flange boss 72, thus to provide a secure connection between the described elements yet at the same time enable angular adjustment of the blade 66 about the axis of the mounting bolt 80 in a manner to be described hereinafter. The core member 78 is fixed to the strut 77 by a suitable threaded stud 79.

The laminar reinforcing ribs 74 are each centrally connected by the described mounting bolt 80, one portion 74a projecting outwardly along the blade 66 in substantial parallelism to its leading edge, and the other portion 74b projecting toward the inner rear corner of the blade wherefore an obtuse angle of approximately 135° is defined between the two portions of each reinforcing rib. The rib adjacent the skin 76 of the blade is relatively long extending substantially entirely to the inner rear corner of the blade as best shown in FIG. 4 and an equal distance toward the outer extremity of the blade. The next superposed rib is somewhat foreshortened and the remaining ribs are in turn foreshortened to provide a shingle-like laminar reinforcing structure. It has been determined that the described laminar reinforcing ribs 74 disposed at the mentioned obtuse angle distribute the stresses for the mounting of a blade in equalized fashion both longitudinally and transversely of the longitudinal axis of the blade and thus form a structurally superior connection. Preferably, small pins 82 provide additional connections between the ribs 74 and the blade skin 76, as clearly shown in FIG. 5.

The foreshortened mounting flange 70c which encompasses the bottom of the blade 66 is also provided with a boss 84 having an opening in registry with central openings in additional laminar reinforcing ribs 86 together with an aligned opening in the lower skin 88 of the blade 66, another in the strut 77, and a threaded opening in the aforementioned core member 78 closely adjacent its inner extremity where a mounting bolt 90 passes through these openings so that its inner end is threadably connected to the core member 78 with its head portion in clamping contact with the lower foreshortened flange 70c in a fashion generally similar to the connection formed by the mounting bolt 80 on the previously described upper mounting flange 70b. The reinforcing ribs 86 on the lower surface of the blade are of stepped laminar configuration generally similar to the reinforcing ribs 74 engaging the top surface of the blade, but the projecting portions 86a, 86b of these ribs are disposed at substantially a right angle to one another, one portion 86a extending outwardly along the blade and the other portion 86b extending at right angles toward the rear innermost corner of the blade with connecting pins 92 also preferably employed. Accordingly, a slightly different stress distribution is provided at the under surface of the blade 66, and this reinforcing arrangement structurally complements the variant reinforcing arrangement at the top of the blade to function conjointly therewith in a manner providing overall equalization of mounting stress distribution and ultimately maximum rigidity of blade supporting both longitudinally and transversely thereof.

In order to provide the aforementioned pivotal motion of the blade 66 about the first mounting bolt 80 so that the blade sweep angle can be adjusted, the opening in the lower mounting flange 70c is enlarged to receive therewithin two eccentric mounting rings 94, 96, the inner of which slidably encompasses the shank portion of the mounting bolt as shown in FIGS. 5 and 6. When the lower bolt 90 is removed, small holes 94a, 96a in each of the rings 94, 96 are exposed so that a spanner wrench can be applied to effect relative rotation thereof wherefore the position of the central opening for the bolt 90 can be shifted along an arc centered at the mounting bolt 80 on the upper blade mounting flange 70b. When, by adjustment of the dual eccentric rings 94, 96, the bolt opening is shifted to a desired position, the entire blade 66 may be pivoted so that its threaded opening is aligned with the adjusted bolt opening within the dual eccentrics, and the lower mounting bolt 90 can be reapplied to secure the blade firmly at its angularly adjusted disposition. Once so adjusted, no rotative force on the eccentric rings 94, 96 is experienced and the new blade angle will be effectively maintained until further adjustment is required.

The mentioned core member 78 which is threaded to receive both of the mounting bolts 80, 90 is a solid metallic member which however terminates a short distance beyond the outer mounting bolt and preferably, as shown at 78a in FIG. 4, is tapered in a shallow curve adjacent its outer end in a horizontal plane and, as shown at 78b in FIG. 5 is bifurcated in a vertical plane, each fork portion gradually tapering to a point at its outer extremity. In this fashion, stresses between the end of the core member 78 and the encompassing blade 66 are distributed to reduce the chance of blade failure at a point of high stress.

In order to vary the pitch of the rotor blades 66, 66' to provide both variation in vertical and lateral motion of the helicopter, lift and directional controls are utilized and, in accordance with the present invention, the two control mechanisms incorporate certain common control linkages which not only simplify the construction of the control mechanism, but also enhance its overall flight characteristics. As previously mentioned, the mounting arrangements for the two blades 66, 66' are substantially identical and are therefore differentiated in the drawings and description by a prime notation, and a similar prime notation will be utilized to differentiate between the control elements for the two blades and the following description will be directed to the structure requisite for control of but a single blade, the other blade being controlled in a similar, operationally-symmetric fashion.

More particularly, a short bracket 100 projects laterally from the side of each of the rotatably supported blade-mounting brackets 70 and carries a ball at its outer end which is in turn rotatably engaged by the interior concave surface of a ring to conjointly form a universal pivotal connection 102 at the lower end of a link 104 whose upper end is similarly provided with a universal connection 106 to the outer end of a lever 108 which is generally horizontally disposed and centrally fulcrumed on a pin 110 carried by an angularly extending bracket 112 mounted on the blade-carrying hub 64. The remote inner end of the lever 108 is connected for universal pivotal motion to the lower extremity of a link 114 whose upper end is universally connected to one end of another substantially horizontal lever 116 which extends across the top of the rotor shaft 52. This lever 116 is centrally pivoted on a generally horizontal pin 118 suitably mounted at the top of a lift-control shaft 120 which extends through the entire hollow interior of the main rotor shaft 52 previously described. The lift-control shaft 120 is keyed to the hollow rotor shaft 52 so that it revolves therewith but is capable of relative axial sliding motion. Such sliding motion is imparted to the lift-control shaft 120 by control linkage 122 connected at one end to the lower extremity of the lift-control shaft whereat the latter projects from the lower end of the rotor shaft 52 and its mounting gear box 50. The connection is by means of a ball bearing (not shown) which permits the mentioned rotation of the lift-control shaft 120 but enables vertical motion of the shaft when the linkage 122 is moved by a manual control handle 124 located in the cockpit of the helicopter. When the handle 124 is pushed forwardly, the lift control shaft 120 is raised to, in turn, lift the center of the control lever 116 mounted at its upper extremity. In turn, the link 114 at the end of the lever 116 is raised to raise one end of the laterally extending lever 108 to in turn effect a lowering of its remote end which in turn lowers the bracket 100 connected to the side of the blade-mounting bracket 70 to effect an increase in blade pitch which, of course, increases the lifting forces on the helicopter during rotor operation.

For purposes of the above-described adjustment of the lift forces, the remote end of the lever 116 at the top of the lift-control shaft 120 can be considered as a fixed fulcrum at the upper end of a connecting rod 130 universally pivoted to this remote end of the lever. However, as will now be explained, the position of the connecting rod 130 can be shifted by the mentioned direction control mechanism for the helicopter when the operator effects adjustment of a direction control handle 132 in the cockpit. Thus, in brief, the control lever 116 at the top of the lift-control shaft 120 is provided with two inputs, both of which are transmitted through the described common linkage to control the set and cyclical pitch of the rotor blades 66, 66'.

More particularly, the lower end of the connecting rod 130 is universally pivotally connected at the outer extremity of a bracket 134 projecting laterally from a control ring 136 mounted for rotation about an outer wobble ring 138 which is pivoted on pins 140, 140' projecting from an inner wobble ring 142 that is, in turn, pivoted on diametrically opposed pins 144, 144' projecting in substantially rectangular relationship to the mounting pins 140, 140' for the outer wobble ring 138 from a sleeve 146 within which the main rotor shaft 52 is free to rotate. The pivotal axes of both wobble rings 138, 142 intersect the axis of the rotor shaft 52 and, in effect, a universal pivotal mounting for the rotatable control ring 136 is provided. As best shown in FIG. 7, the outer wobble ring 138 projects below the remainder of the described structure and has attached thereto the extremity of the mentioned direction control handle 132 which projects radially outwardly and thence downwardly into the cockpit. Preferably, as shown in FIG. 1, the lower end of the direction control handle 132 is bent inwardly and finally upwardly, the latter upwardly projecting section 132a being manually engaged by the operator or pilot in the cockpit of the helicopter. When the handle 132 is so grasped, the adjacent horizontal portion of the control handle provides a rest for the operator's hand so that it will not accidentally slip downwardly from the control handle. It is also preferred to provide additional stabilizing support for the rotatable control ring 136 which additional support, as shown best in FIG. 3, includes a pair of pivoted links 150, 151 pivotally secured to the exterior of the control ring in rectangular relationship to the described connecting rod brackets 134, 134' and pivotally secured at their remote ends to a sleeve 152 mounted above the wobble rings 138, 142 for rotation with the rotor shaft 52. Thus, though the disposition of the control ring 136 may vary, stable driving connection with the shaft 52 is assured.

The operating arrangement is such that if the control handle 132 is moved forwardly by the pilot, the helicopter will also move forwardly; if the control handle is moved to the right, the helicopter moves to the right; if the control handle is pulled rearwardly, the helicopter tends to move rearwardly and, in turn, if the control handle is moved to the left, the helicopter, itself, will move to the left. If it is assumed that the control handle 132 is moved ahead, the forward motion of the helicopter is achieved in substantially the following manner. As the direction control handle is moved forwardly, the front of the wobble rings 138, 142 will be raised which will in turn effect a raising of the front portion of the rotating control ring 136 and a correspondent lowering of the rear portion thereof, but the portions of the control ring extending laterally relative to the handle 132 will remain in substantially the original horizontal disposition. Since the brackets projecting from the control ring 136 and the control levers 116, 116' at the top of the lift-control shaft 120 together with the connecting rods 130, 130' therebetween lie in a plane which is at right angles to a vertical plane through the rotor blades, 66, 66', the blades in a fore and aft disposition will lie in substantially a horizontal plane (dependent of course upon the setting of the lift-control shaft). As the rotor shaft 52 and the blades 66, 66' rotate in the normal counter-clockwise direction, as viewed in FIG. 1, from the illustrated fore and aft disposition, one of the control brackets 134 will be lifted as it moves to a forwardly-extending disposition and the other bracket 134' will be lowered as it moves to a rearward disposition. Accordingly, one of the connecting rods 130 will be pushed upwardly while the other rod 130' will be pulled downwardly, and after 90° of blade rotation, the blade 66 projecting from the left of the helicopter will have a maximum upward pitch while the blade 66' projecting to the right will have a maximum downward pitch.

It should be mentioned that during the directional control as described above, the lift-control shaft 120 remains substantially stationary so as to function as a central fulcrum point for the control levers 116, 116'.

As rotation continues, the rotor blades 66, 66' will reassume a horizontal disposition as the 180° rotative position is attained. The described cyclical pitch variation of the rotor blades 66, 66' continues in a similar fashion and is, as is well established in accordance with basic principles of helicopter flight characteristics, that cyclical pitch variation requisite to achieve forward motion of the helicopter. In a correlated fashion, the other movements of the control handle 132 will similarly tilt the control ring 136 to achieve the cyclical pitch variation of the rotor blades 66, 66' requisite to the particular direction of the movement desired.

In accordance with an additional aspect of the present invention, stabilizing weights 160, 160' are supported from the rotor shaft 52 in rectangular relationship to the described rotor blades 66, 66' and undergo a cyclical positional variation correlated with the pitch variation of the blades themselves and under the control of the direction control handle 132. More particularly, as best shown in FIG. 7, the two weights 160, 160' are supported in statically and dynamically balanced relationship at the opposite extremities of a diametrically disposed rod 162 whose central portion is divided into spaced parallel sections 162a, 162b which pass on opposite sides of the rotor shaft 52. A hub 164 is fixed to the rotor shaft and two pins 166, 166' project laterally therefrom to pivotally support the diametric weight-carrying rod 162, thus to permit variation in the angularity of such rod relative to the rotor shaft upon which it is pivotally mounted. Through the expediency of short links 168, 168' extending substantially vertically between a universal pivotal connection to the rod 162 at their upper ends and to the connecting rod brackets 134, 134' on the control ring 136 thereunder, variation of the control ring disposition in the manner described hereinabove effects an equivalent variation in the disposition of the diametrical rod 162 and the weights 160, 160' supported at its opposite extremities. Preferably, each control link 168 is resiliently connected to the weight-supporting rod by a lost motion mechanism 170 which, as illustrated, takes the form of coil springs 172, 174 resiliently engaging the upper and lower surfaces of a spacer 176 for the two divided sections of the rod 162 and joined at their opposite extremities to circular flanges 168a on the connecting link. Since the weights 160, 160' rotate during flight and thus tend, as a result of centrifugal force, to retain a rectangular relationship relative to the rotor shaft 52, movement of the control ring 136 as a result of pilot manipulation of the direction control handle 132 will immediately effect a variation in cyclical pitch of the rotor blades 66, 66' but initial motion of the control ring 136 will not immediately effect a change in the disposition of the weight-supporting rod 162, the described lost motion mechanism 170 essentially requiring a predetermined amount of movement of the control ring 136 before sufficient displacement force is transferred to the weight-supporting rod 162 to vary its angular disposition. Furthermore, even after the angular disposition of the weight-supporting rod 162 has been changed, centrifugal force will urge the weight-supporting rod 162 back into its original rectangular relationship relative to the rotor shaft 52 against the force of the coil springs 172 or 174. The overall effect of the lost motion mechanism 170, as described hereinabove, is to stabilize the flight of the helicopter particularly during moments when a change of direction in instigated.

While the foregoing description of the structural elements of the illustrated helicopter and their individual operational characteristics result in overall operational characteristics of an improved nature in accordance with the objects and features of the present invention, a brief summarization of such overall operational characteristics will more clearly indicate the advantages derived therefrom. If it is initially assumed that the engine 16 is operating so that rotation of the sustaining rotor 18 and of the torque-compensating rotor 20 is instigated, the helicopter can be lifted from a position of rest on the ground by the simple expedient of pushing forwardly the lift-control handle 124 in the cockpit which simultaneously increases the pitch of both rotor blades 66, 66' to, in turn, produce the lifting forces requisite to initiate vertical ascent of the helicopter. Subsequent pulling of this lift-control handle 124 will enable the helicopter to hover at a desired vertical position or to descend at a controlled rate to the ground. The simplified landing gear 26 provides for an absorption of shock upon such landing, but in the fashion described in detail hereinbefore, the stresses resultant from ground engagement are distributed through the landing gear structure to preclude structural failure thereof.

If while hovering, forward motion of the helicopter is desired, the direction control handle 132 is moved forwardly by the pilot, which action simultaneously instigates cyclical variations in the rotor blade pitch and also in the angular disposition of the weight-supporting rod 162. More particularly, forward motion of the direction control handle 132 is operative through the resultant positional variation in the control ring 136 and associated linkage to effect the cyclical pitch variation of the rotor blades 66, 66' in the manner described in detail hereinabove which creates a forward force component which is exerted on the rotor shaft 52 at point of blade support, such force tending to create a tilting of the entire helicopter in a forward direction, a forward tilting of the rotor shaft to an angle of 8° from the vertical being typical.

At the same time that the cyclical pitch variation is introduced into the blades 66, 66' by the movement of the direction control handle, 132, this same handle motion effects, through the lost motion mechanism 170, an angular displacement of the weight-supporting rod 162 a cyclically variable amount which maintains the rotation of the weights 160, 160' in a plane which is substantially horizontal and therefore non-perpendicular to the forwardly-tilted rotor shaft 52.

Since such angular displacement of the revolving weights is opposed by centrifugal forces, the weights will tend to reassume rotation in a plane perpendicular to the rotor shaft 52, and such rotational plane will be reestablished as forward motion of the helicopter at a desired speed is attained. Through feedback to the control handle 132, the latter will also reassume a neutral position which will be retained until further directional change is desired. If the change in the position of the directional control handle 132 is but slight, substantially no change in the angular disposition of the weight-supporting rod 162 is encountered because of the lost motion mechanism 170 and undesired imbalance is thus avoided.

Additionally, it is to be expressly noted that any imbalance of lift resultant from a sudden gust of wind is automatically accommodated by the pivotal support of the rotor hub 64 on the top of the rotor shaft 52, the blade being engaged by a sudden upward force tilting upwardly so that the opposite blade will be tilted downwardly to restore the balance of lifting forces on the two blades and maintain the helicopter in its initial stable disposition.

The foot controls in the cockpit are connected to the tail rotor 20 in the conventional fashion to enable desired turning of the helicopter and the elevator 22 thereon is preferably adjusted to an angle optimized for stability of the helicopter in its normal forward cruising operation, for example, at 80 miles per hour. Since, as previously mentioned, these elements are of conventional nature and are operated in a conventional fashion, no further explication is presented.

It is apparent that many modifications and/or alterations in the structure as described in detail can be made without departing from the spirit of the present invention and the foregoing description of one embodiment of the invention is therefore to be considered purely as exemplary and not in a limiting sense and the actual scope of the invention is to be indicated only by reference to the appended claims.

What is claimed is:
1. In a helicopter having a rotor shaft and a sustaining rotor including at least two blades supported on the shaft for rotation therewith, an arrangement for mounting each of said blades which comprises:
   a blade-mounting bracket having flanges encompassing the upper and lower surfaces of a blade,
   means including a first bolt for securing one flange to the upper surface of said blade,
   means including a second bolt for securing the other flange to the lower surface of said blade at a position spaced from said first bolt,
   said lower flange having an opening therethrough which is larger than the diameter of said second bolt, and
   a pair of relatively rotatable eccentric members positioned coaxially in said enlarged bolt opening.
2. In a helicopter according to claim 1
   a central core member in said blade having a pair of threaded openings for reception of said bolts.
3. In a helicopter according to claim 2
   said core member extending from the inner supported end of said blade toward the outer tip end thereof,
   the outer terminal portion of said core member being of tapered bifurcated configuration whereby stresses are distributed.
4. In a helicopter according to claim 3
   a plurality of stress-distributing ribs on the upper and lower surfaces of said blade adjacent said first and second bolts.
5. In a helicopter according to claim 4
   said ribs on the upper surface of said blade having portions extending in opposite directions from said first bolt and defining an obtuse angle therebetween.
6. Mounting arrangement for the blade of a helicopter or the like which comprises
   a blade-mounting bracket having flanges encompassing the upper and lower surfaces of a blade,
   a plurality of stress-distributing ribs arranged in laminar fashion on the upper and lower surfaces of the blade adjacent said mounting flanges,
   said ribs on one surface of said blade having portions extending in opposite directions to define an obtuse angle therebetween, and
   means for securing each of said upper and lower flanges to said blade and to said stress-distributing ribs.
7. Mounting arrangement for a helicopter blade according to claim 6 wherein
   said securing means includes a bolt,
   a threaded opening in said blade for reception of said bolt,
   an enlarged opening in one of said flanges for said bolt, and
   dual rotatable eccentric members in said enlarged opening for varying the disposition of said bolt relative to said flange.
8. In a helicopter or the like having a fuselage including transverse and longitudinal frame members, a landing gear which comprises
   a pair of like laterally-spaced, ground-engaging runners,
   two legs secured to each of said runners at their lower ends and to said frame members at their upper ends,
   a sleeve secured to said frame members and slidably encompassing each of said legs intermediate its ends.
9. A landing gear according to claim 8 wherein
   said legs each are disposed at an angle of approximately 80° relative to a longitudinal line through said fuselage.
10. A landing gear according to claim 9 which comprises
   reinforcing members on each leg adjacent its juncture with the frame members.
11. A helicopter which comprises
   a fuselage,
   a hollow rotor shaft mounted for rotation about a substantially vertical axis on said fuselage,
   a sustaining rotor carried at the upper end of said rotor shaft,
   said rotor including at least two blades, each of which is mounted for rotative adjustment to vary its pitch,
   operating linkage connected to each blade to enable variation of its pitch,
   lift control means for adjusting said linkage to establish a pre-selected blade pitch productive of desired lift forces upon rotor rotation,
   direction-control means operatively connected to said linkage to vary the blade pitch cyclically in response to blade rotation for establishing desired lateral forces upon rotor rotation,
   said operating linkage includes a lever mounted over the top of said rotor shaft and operatively connected at a first position to one of said blades,
   said lift control means includes a lift-control shaft axially movable within said hollow rotor shaft and connected to said lever at a second position whereby axial movement of said lift-control shaft effects a variation in blade pitch,
   said direction control means includes operating linkage connected to said lever at a third position,
   said direction control means includes a control ring mounted for rotation with said rotor shaft and for universal pivotal displacement relative thereto,
   a rod mounted on said rotor shaft for pivotal motion about an axis perpendicular to the shaft axis and having weights at its extremities on opposite sides of said shaft, and
   means operatively interconnecting said rod and said control ring whereby pivotal adjustment of said control ring effects pivotal displacement of said rod.
12. A helicopter according to claim 11 wherein
   said interconnecting means includes a lost motion mechanism.
13. A helicopter which comprises
   a fuselage, a rotor shaft mounted for rotation about a substantially vertical axis on said fuselage, a sustaining rotor including at least two blades, a blade-mounting bracket for each blade rotatably supported about an axis extending transversely relative to the rotor shaft axis, said blade-mounting bracket having flanges encompassing the upper and lower surfaces of a blade, means including a bolt for securing each of said flanges to said blade, one of said securing means including an opening through said one flange larger than the bolt diameter whereby adjustment of the blade angle when secured to said flanges is enabled, and said adjustable blade-securing means includes a pair of rotatable eccentric members positioned coaxially in said enlarged opening.

References Cited by the Examiner

UNITED STATES PATENTS

| | | | |
|---|---|---|---|
| 2,429,502 | 10/1947 | Young | 244—17.17 |
| 2,495,523 | 1/1950 | Hays | 170—160.57 |
| 2,761,635 | 9/1956 | Hiller et al. | 170—160.25 |

MILTON BUCHLER, *Primary Examiner.*

L. C. HALL, *Assistant Examiner.*